UNITED STATES PATENT OFFICE.

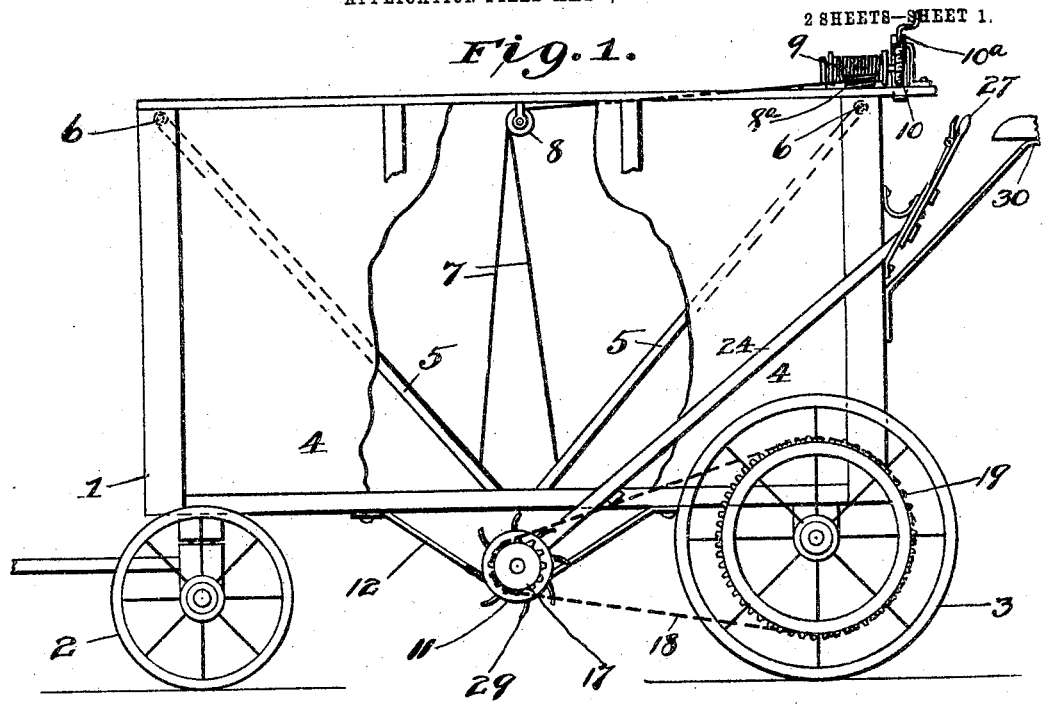
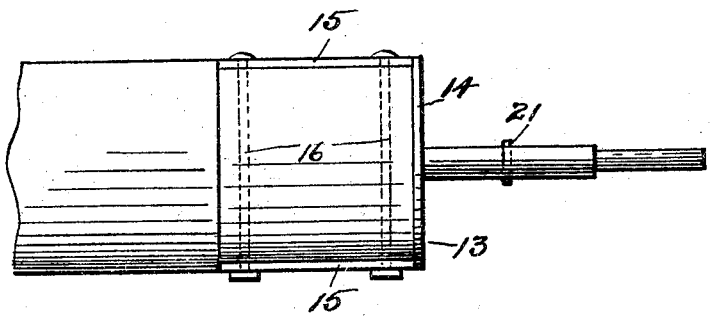
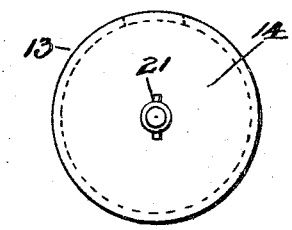

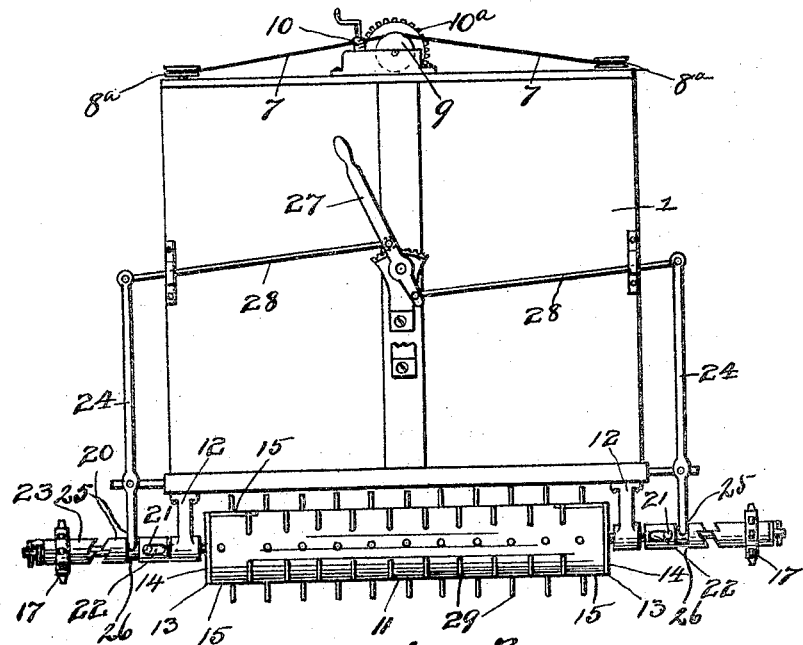
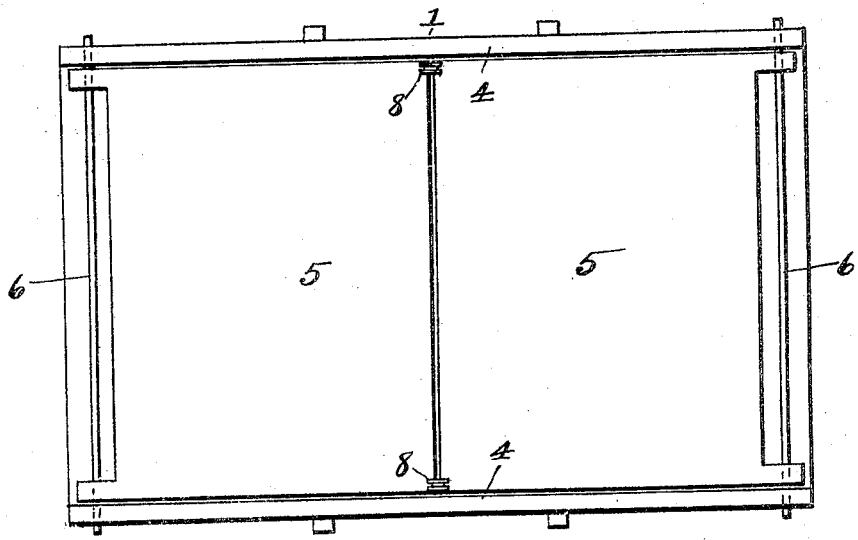

TOLEF SOLBERG, OF CROOKSTON, MINNESOTA.

MANURE-SPREADER.

No. 798,119.    Specification of Letters Patent.    Patented Aug. 29, 1905.

Application filed May 6, 1904. Serial No. 206,748.

*To all whom it may concern:*

Be it known that I, TOLEF SOLBERG, a citizen of the United States, residing at Crookston, in the county of Polk and State of Minnesota, have invented certain new and useful Improvements in Manure-Spreaders, of which the following is a specification.

My invention relates to machines for spreading manure, and has for its object the provision of improved means for regulating the amount of manure to be spread and improved means for spreading it.

The construction and advantages of my invention will fully appear hereinafter and by reference to the accompanying drawings, in which—

Figure 1 is a side view, partly in section, of a manure-spreader constructed in accordance with my invention; Fig. 2, a rear view; Fig. 3, a top plan view; Fig. 4, a side view of one end of the distributing-roller, and Fig. 5 an end view of the part of the roller shown in Fig. 4.

In the drawings similar reference characters indicate corresponding parts throughout the several views.

1 represents the frame of my machine, mounted upon wheels 2 at the front of the machine and 3 at the rear.

4 represents the side boards secured to the frame 1, and 5 inclined bottom boards pivotally mounted on rods 6, secured in said frame 1. The free ends of bottom boards 5 are adjusted by means of ropes or chains 7, secured at each side of said boards and passing around pulleys 8, and sheaves 8ª are wrapped on drum 9 at the rear of the machine. Drum 9 is actuated by means of worm-shaft 10 meshing with worm-wheel 10ª, secured to the shaft of drum 9.

11 represents a roller journaled in brackets 12, secured to the bottom of frame 1. Roller 11 is made, preferably, of wood and is journaled in brackets 12 by means of trunnions 13, each having a flat portion 14 to rest against the end of the roller and parallel arms 15, secured to the roller by means of bolts 16.

17 represents sprocket-wheels journaled on the ends of trunnions 13 and geared, by means of chains 18, to sprocket-wheels 19, secured to rear wheels 3.

20 represents clutch-sleeves splined on trunnions 13 by means of pins 21, secured in said trunnions and slots 22 in said sleeves, the ends of said clutch being adapted to engage with clutch-surfaces 23 on the inner ends of hubs of sprocket-wheels 17. Clutch-sleeves 20 are actuated by means of levers 24, fulcrumed on the sides of frame 1, each of said levers having a forked end 25, seated in a groove 26 in said sleeve.

27 represents an operating-lever fulcrumed on the back of the machine and connected, by means of rods 28, with the free ends of levers 24.

Roller 11 is provided with spur-teeth 29 for breaking up and distributing the manure as it drops out from between the bottom boards 5. Teeth 29 are preferably made curved, as shown in Fig. 1, and staggered on the roller, as shown in Fig. 2.

30 represents a seat for the driver and operator secured to the rear of the machine and arranged conveniently to worm-shaft 10 and operating-lever 27.

I am aware of the fact that manure-spreaders and fertilizer-distributers have been heretofore patented having pivoted bottom boards; but in every case these boards have been pivoted at their lower ends, and the only function performed thereby has been to clear the box of its contents. In my device the boards are pivoted at their upper ends, and in addition to the function performed by the structure of the former patents this construction enables the use of my machine for hauling the manure to the place for distribution, as the lower ends of the bottom boards may be brought together to form a closed wagon-box, and the feeding of the manure may be regulated by regulating the width of the opening between the boards when the machine is in operation.

Having thus described my invention, what I claim is—

1. In a manure-spreader, a box-like frame, bottom boards pivoted in the upper portion of said frame and inclined toward the center thereof, and means to swing said bottom boards, substantially as shown and described.

2. In a manure-spreader, a box-like frame, bottom boards pivoted in the upper portion of said frame and inclined toward the center thereof, a drum suitably mounted, and ropes secured to the free ends of said bottom boards and to said drum, substantially as shown and described.

3. In a manure-spreader, a box-like frame, bottom boards pivoted in the upper part of said frame and inclined toward its center, means to swing the free ends of said boards, and a distributing device located beneath the free ends of said bottom boards, substantially as shown and described.

4. In a manure-spreader, a box-like frame, bottom boards pivoted in the upper part of said frame and inclined toward its center, means to swing the free ends of said boards, a roller journaled below the free ends of the boards, and means to actuate said roller, substantially as shown and described.

5. In a manure-spreader, a box-like frame, bottom boards pivoted in the upper part of said frame and inclined toward its center, a drum mounted on said frame, ropes connecting said drum and the free ends of said bottom boards, a toothed roller journaled beneath the free ends of said boards, means to rotate said roller, and a clutch to throw said roller into and out of gear with the rotating means, substantially as shown and described.

6. In a manure-spreader, a box-like frame mounted on wheels, bottom boards pivoted in the upper part of said frame and inclined toward its center, a drum mounted on said frame, ropes connecting said drum and the free ends of said bottom boards, a toothed roller journaled beneath the free ends of said boards, gearing connecting the ends of said roller with two of the wheels aforesaid, and a clutch to throw said roller into and out of gear, substantially as shown and described.

7. In a manure-spreader, a box-like frame mounted on wheels, bottom boards pivoted in the upper part of said frame, ropes secured to the free ends of said bottom boards, and a drum to receive the free ends of said ropes, said ropes being adapted to operate said bottom boards so that their edges meet or are spaced apart at any distance desired, substantially as shown and described.

In testimony whereof I hereto affix my signature in the presence of two witnesses.

TOLEF SOLBERG.

Witnesses:
  E. O. HAGEN,
  GEORGIE BAWGEN.